United States Patent
Low et al.

(10) Patent No.: US 10,210,501 B2
(45) Date of Patent: Feb. 19, 2019

(54) ELECTRONIC PAYMENTS TO NON-INTERNET CONNECTED DEVICES SYSTEMS AND METHODS

(71) Applicant: PAYPAL, INC., San Jose, CA (US)

(72) Inventors: Gak Wee Low, San Jose, CA (US); Michele Lee, San Jose, CA (US); Mark Wenger, San Jose, CA (US); Xin Sun, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 55 days.

(21) Appl. No.: 13/951,322

(22) Filed: Jul. 25, 2013

(65) Prior Publication Data

US 2014/0032413 A1     Jan. 30, 2014

Related U.S. Application Data

(60) Provisional application No. 61/675,694, filed on Jul. 25, 2012.

(51) Int. Cl.
| | |
|---|---|
| G06Q 20/18 | (2012.01) |
| G06Q 20/32 | (2012.01) |
| G07F 9/02 | (2006.01) |

(52) U.S. Cl.
CPC .......... *G06Q 20/327* (2013.01); *G06Q 20/18* (2013.01); *G07F 9/026* (2013.01)

(58) Field of Classification Search
CPC .............................. G06Q 20/00; G06Q 20/327
USPC .......................................................... 705/44
See application file for complete search history.

(56) References Cited

U.S. PATENT DOCUMENTS

| | | | |
|---|---|---|---|
| 5,771,778 A * | 6/1998 | MacLean, IV | G07F 9/02 221/13 |
| 6,193,154 B1 * | 2/2001 | Phillips et al. | 235/381 |
| 7,085,556 B2 | 8/2006 | Offer | |
| 2002/0099662 A1 * | 7/2002 | Joshi | 705/64 |
| 2003/0120936 A1 * | 6/2003 | Farris | G06F 21/83 713/189 |
| 2003/0126046 A1 * | 7/2003 | Kataoka et al. | 705/28 |
| 2004/0117262 A1 | 6/2004 | Berger et al. | |

(Continued)

FOREIGN PATENT DOCUMENTS

| | | |
|---|---|---|
| CN | 1304240 | 7/2001 |
| CN | 1381806 | 11/2002 |

(Continued)

OTHER PUBLICATIONS

International Search Report for PCT Application No. PCT/US13/52130, dated Dec. 23, 2013.

*Primary Examiner* — Robert R Niquette
*Assistant Examiner* — Liz P Nguyen
(74) *Attorney, Agent, or Firm* — Haynes & Boone, LLP

(57) ABSTRACT

There is provided systems and method for an electronic payment to a non-Internet connected device. The methods include transmitting information corresponding to at least one item for sale at a non-Internet connected machine, receiving a purchase request from a user device for the at least one item from the non-Internet connected machine, and communicating, using a hardware processor of a payment provider server, an approval of the purchase request to the user device, wherein the user device is configured to transmit a purchase authorization to the non-Internet connected machine using a wireless connection.

18 Claims, 5 Drawing Sheets

(56) References Cited

U.S. PATENT DOCUMENTS

| | | | |
|---|---|---|---|
| 2004/0210486 A1* | 10/2004 | Carapelli | 705/16 |
| 2004/0249712 A1* | 12/2004 | Brown | G06Q 30/02 705/14.19 |
| 2005/0131577 A1 | 6/2005 | Ota et al. | |
| 2006/0247824 A1* | 11/2006 | Walker | G06O 20/02 700/241 |
| 2008/0033594 A1* | 2/2008 | Packes, Jr. | G06Q 30/02 700/232 |
| 2008/0052175 A1* | 2/2008 | Walker | G06Q 10/087 705/16 |
| 2009/0055316 A1* | 2/2009 | Myers et al. | 705/40 |
| 2009/0192935 A1* | 7/2009 | Griffin | G06Q 20/10 705/41 |
| 2011/0301983 A1* | 12/2011 | Guida | G06Q 40/00 705/4 |
| 2011/0320347 A1* | 12/2011 | Tumminaro et al. | 705/39 |

FOREIGN PATENT DOCUMENTS

| | | |
|---|---|---|
| CN | 1801228 | 7/2006 |
| CN | 101887610 | 11/2010 |
| EP | 1316928 | 6/2003 |
| EP | 1768071 | 3/2007 |
| EP | 2061001 | 5/2009 |
| WO | WO 0145058 | 6/2001 |

* cited by examiner

ELECTRONIC PAYMENTS TO NON-INTERNET CONNECTED DEVICES SYSTEMS AND METHODS

CROSS REFERENCE TO RELATED APPLICATION

Pursuant to 35 U.S.C. § 119(e), this application claims priority to the filing date of U.S. Provisional Patent Application Ser. No. 61/675,694, filed Jul. 25, 2012, which is incorporated by reference in its entirety.

BACKGROUND

Technical Field

The present application generally relates to electronic payments, and more particularly, to wireless electronic payments to non-Internet connected machines through user devices.

Related Art

Currently, electronic payments can be made through various user devices, such as PCs, laptops, tablets, and smart phones. Such devices rely on communication between the user device and at least an electronic payment provider. For example, a consumer may make a purchase or provide payment details for a product through an online site by communicating information through an Internet connection. In addition to traditional online purchases/payments and more recently to payments made through smart phones, Internet-enabled unmanned devices, such as vending machines and kiosks, allow a consumer to make an electronic purchase. For example, the vending machine may read a payment card or other funding source information from a consumer, and process/authenticate the payment, such as through a communication with a payment provider. This eliminates the need for a consumer to carry cash and/or small bills in order to make a purchase from an unmanned machine.

However, as with other electronic payment methods, when the unmanned machine does not have or loses Internet connection, the electronic payment option may not be available for the consumer. Additionally, unmanned machines capable of internet connectivity are not widespread and require significant upgrading or replacement of the machine before being operational. Thus, complications may lead to lost sales for a merchant and inconvenience for the consumer.

Figure 1:
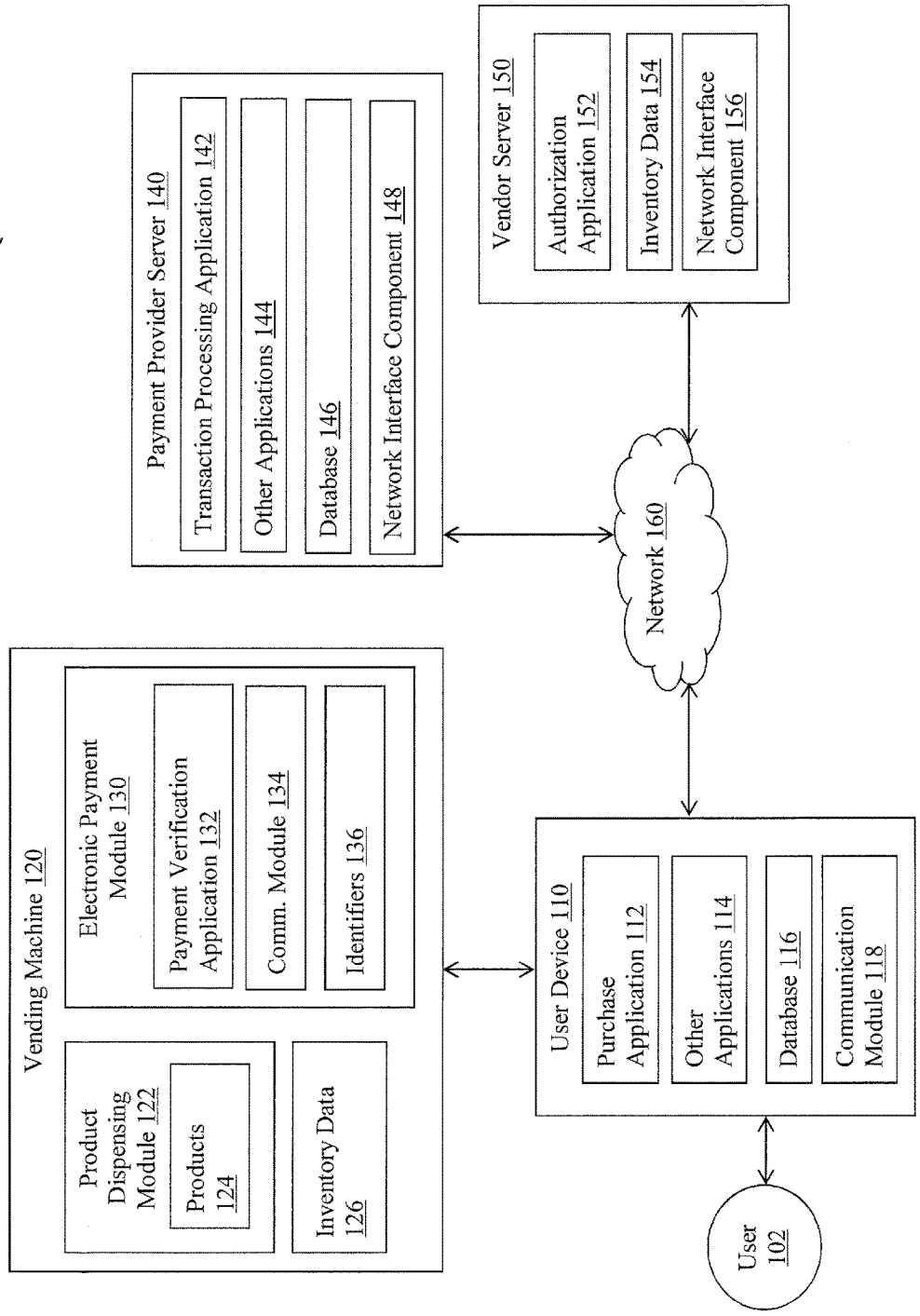
FIG. 1 is a block diagram of a networked system suitable for implementing the process described herein according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

According to various embodiments, a consumer device, such as a smart phone or computing tablet, communicates with a non-Internet connected unmanned device/machine via wireless communication, such as Bluetooth or NFC (Near Field Communication) means, for making a payment to the device utilizing a payment provider. The non-Internet connected machine (NICM) transmits a machine identifier to the user device, which allows the user device to retrieve a menu of items at the specific machine from the payment provider or an operator of the machine. In some embodiments, the NICM, the payment provider, and/or the operator of the machine may send product details to the user device to upsell or advertise products available on the NICM. The menu is then displayed on the user device, and the user selects desired item(s) for purchase. Note that in some embodiments, multiple machines may send their unique identifiers, such that the user is able to select one or more machines to purchase from.

The user may then add desired item(s) from one or more machines to a cart and make the purchase through a payment provider. The purchase request is communicated to the payment provider over a wireless network. The payment provider processes the request, and if approved, sends approval information back to the user device. In various embodiments, the user device communicates the approval information to the machine, which then dispenses the purchased item(s).

In other embodiments, a NICM and a user device are paired, e.g., through a NFC or Bluetooth communication. The user device transmits a user identifier to the machine for display. During display of the user identifier, the user can then select one or more items for purchase from the machine. The machine then transmits a purchase request, such as a product name, product price, product code, a machine identifier, and/or a transaction number back to the user device. The user device displays the purchase request and, if the information is correct, the user selects a payment button or option on the user device, which communicates the payment request to a payment provider. After processing, the payment provider may approve the payment request and communicate the approval directly to an operator of the machine, such as a vendor server, or may communicate the approval to the user device to be transmitted to the operator of the machine. The operator may, in response to the communication, transmit a purchase authorization to the user device. This purchase authorization may include a private key to encrypt a dispense message that includes the machine identifier, transaction number, and any other desired data. The user device may then communicate the purchase authorization to the machine, which may decrypt the information and dispense the purchased items(s) associated with the transaction number.

FIG. 1 is a block diagram of a networked system suitable for implementing the process described herein according to an embodiment. As shown, a networked system environment 100 may comprise or implement a plurality of networked devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. Additionally, system environment 100 may include non-networked devices in communication with the networked devices and/or servers. One or more devices and/or servers may be operated and/or maintained by the same or different entities.

System environment 100 may be configured to handle processes in accordance with embodiments provided herein. System environment 100 includes a user 102 utilizing a user device 110 with a vending machine 120, where user device 110 is in communication over a network 160 with a payment provider server 140 and a vendor server 150. Additionally, payment provider server 140 and vendor server 150 may be in contact using network 160.

User device 110, vending machine 120, payment provider server 140, and vendor server 150 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system environment 100, and/or accessible over network 160.

User device 110 may be implemented using any appropriate hardware and software configured for wired and/or wireless communication over network 160. For example, in one embodiment, user device 110 may be implemented as a personal computer (PC), a smart phone, personal digital assistant (PDA), laptop computer, and/or other types of computing devices capable of transmitting and/or receiving data, such as an IPAD® from APPLE®. Although a user device is shown, the user device may be managed or controlled by any suitable processing device. Although only one user device is shown, a plurality of user devices may be utilized.

User device 110 of FIG. 1 contains a purchase application 112, other applications 114, a database 116, and a network interface component 118. Purchase application 112 and other applications 114 may correspond to processes, procedures, and/or applications executable by a hardware processor, for example, a software program. In other embodiments, user device 110 may include additional or different software as required.

Purchase application 112 may be used, for example, to provide a convenient interface to permit user 102 to select, purchase, and dispense products for sale at a vending machine 120. For example, in one embodiment, purchase application 112 may be implemented as a downloadable application having a user interface enabling the user to purchase products for sale at vending machine 120. In some embodiments, purchase application 112 may correspond more generally to a web browser configured to view information available over the Internet or access a website corresponding to products purchasable at vending machine 120. Thus, purchase application 112 may be utilized access marketplace websites and engage in online transactions.

In various embodiments, purchase application 112 may access a menu or other data of purchasable products at vending machine 120. However, in other embodiments, purchase application may interface with a corresponding module at vending machine 120 and receive a purchase request containing, for example, a product name, product price, product code, a machine identifier, and/or a transaction number. Purchase application may further interface with the corresponding module at vending machine 120 to transmit approvals and/or purchase authorizations, thus dispensing the purchased product at a convenient time.

In various embodiments, user device 110 includes other applications 114 as may be desired in particular embodiments to provide desired features to user device 110. For example, other applications 114 may include security applications for implementing client-side security features, programmatic client applications for interfacing with appropriate application programming interfaces (APIs) over network 160, or other types of applications. Other applications 114 may also include email, texting, voice and IM applications that allow user 102 to send and receive emails, calls, texts, and other notifications. Other applications 114 may contain software programs, such as a graphical user interface (GUI), executable by a processor that is configured to provide an interface to a user.

User device 110 may further include one or more database 116 which may be implemented, for example, as operating system registry entries, cookies associated with purchase application 112 and/or other applications 114, data associated with hardware of user device 110, such as a device identifier, or other appropriate data used for authentication/identification of user device 110 and/or payment of products. In one embodiment, database 116 may include identifiers used by a service provider, such as payment provider server 140, to associate user 102 with a particular account maintained by the service provider. Database 116, in various embodiments, may further include information received from vending machine 120 through purchase application 120, such as machine identifier. Additionally, database 116 may store user preferences related to purchase application 112, such as past purchases, preferred products, or other desirable data.

In various embodiments, user device 110 includes at least one communication module 118 adapted to communicate with vending machine 120 and/or network 160 including payment provider server 140 and/or vendor server 150. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Moving to a vending machine 120, vending machine 120 may be a vending machine, kiosk, terminal, or other device for dispensing items that are purchased. Vending machine 120 does not have Internet connection with network 160, but does have capability of wireline or wireless communication with user device 110, for example using microwave, radio frequency, infrared, Bluetooth, and near field communication, as well as processing as described herein. In one embodiment, vending machine 120 includes an electronic payment module 130 having storage and communication interface to store and communicate a machine identifier and other transaction information, as well as processing (including decrypting) information for dispensing purchased items from vending machine 120, as discussed herein. Vending machine 120 may also include an product dispensing module 122 for accepting user input, such as for selecting desired items to purchase, and inventory data 126 corresponding to products sold and/or available. Vending machine 120 may be maintained, for example, by a retail product vendor, such as COCACOLA®.

Vending machine 120 of FIG. 1 is shown with a product dispensing module 122 having products 124, inventory data 126, and an electronic payment module 130 having a payment verification application 132, communication module 134, and identifiers 136. Product dispensing module 122, electronic payment module 130, payment verification application 132, and communication module 134 may correspond generally to hardware and/or software components necessary to implement the various features described herein.

Vending machine 120 includes generally a product payment and dispensing module, such as product dispensing module 122, for a user to make selections, purchase, and dispense products 124. Product dispensing module 122 may include means to select a product, such as using a keypad, touchscreen, display, or other selection means. Additionally, product dispensing module 122 may include payment means, such as a coin or bill accepting device. However, as described herein, in the event user 102 does not have sufficient money, product dispensing module 122 is further configured to interact with electronic payment module 130 to accept electronic payment for products 124. Product dispensing module 122 may further contain dispensing means for use with products 124. Products 124 may include purchasable products for user 102, such as drinks, food, items, or other purchasable products included in vending machine 120.

Inventory data 126 may correspond generally to data of purchased and purchasable products at vending machine 120. Inventory data 126 may include current stocks of products 124, sold out products of products 124, purchase demands and/or rates of products 124, or other desired data. Inventory data 126 may be utilized with user device 110 to display to user 102, and/or with payment provider server 140 and vendor server 150 to provide analytics.

Electronic payment module 130 included with vending machine 120 enables user 102 to make electronic payments for products 124 in the absence of physical money. Thus, electronic payment module 130 contains a payment verification application 132, a communication module 134, and identifiers 136. As previously discussed, electronic payment module 130 and communication module 134 may correspond generally to hardware and/or software components necessary to implement the various features described herein.

Electronic payment module 130 includes generally a payment verification application 132, communication module 134, and identifiers 136 necessary to effectuate and verify and electronic payment of products 124. Thus, payment verification application 132 may include an interface application for use with purchase application 112 in order to transmit data necessary for an electronic payment and verify the payment. Payment verification application 132 may correspond to processes, procedures, and/or applications executable by a hardware processor, for example, a software program. In other embodiments, electronic payment module 130 may include additional or different software as required. Payment verification application 132, in various embodiments, may receive an approval of a payment from user device 110, verify the approval, and dispense items purchased from products 124 using product dispensing module 122. In other embodiments, payment verification application 132 may first transmit a purchase request including a product name, product price, product code, a machine identifier, and/or a transaction number to user device 110 to transmission with a payment request to a service provider, such as payment service provider 140.

In various embodiments, electronic payment module 130 includes at least one communication module 134 adapted to communicate with user device 110. In various embodiments, communication module 134 may include various types of wired and/or wireless short range communication devices including microwave, radio frequency, infrared, Bluetooth, and near field communication devices.

User device 110 may further include one or more identifiers 136 which may be implemented, for example, as data associated with products 124, data associated with hardware of vending machine 120 and/or electronic payment module 130, or other appropriate data used for authentication/identification of vending machine 120, products 124, and/or electronic payment module 130. In one embodiment, identifiers 136 may include identifiers used by a service provider, such as payment provider server 140, to identify a product, a product price, a product information, vending machine 120, and/or electronic payment module 130. Additionally, identifiers 136 may store user identification corresponding to user device 110, for example, to enable quick pairing of user device 110 and electronic payment module 130 using a wireless short range communication means.

Payment provider server 140 may be maintained, for example, by an online payment service provider, which may provide processing for online financial and information transactions on behalf of a user with a NICM. In this regard, payment provider server 140 includes one or more processing applications which may be configured to interact with user device 110 over network 160 to facilitate payments between user device 110 and vending machine 120. In one example, payment service provider 170 may be provided by PayPal®, Inc. of San Jose, Calif., USA.

Payment provider server 140 of FIG. 1 includes a transaction processing application 142, other applications 144, database 146, and a network interface component 148. Transaction processing application 142 and other applications 144 may correspond to processes, procedures, and/or applications executable by a hardware processor, for example, a software program. In other embodiments, payment provider server 140 may include additional or different software as required.

Payment provider server 140 may include one or more transaction processing application 142, which may be configured interact with purchase application 112 of user device 110 over network 160 to facilitate payment of products 124 of vending machine 120. In various embodiments, transaction processing application 142 includes feature to receive and/or identify payment requests, for example a payment request including a product, product price, machine identifier, and funding source information, and effectuate a purchase of the designated item. Transaction processing application 142 in configured to receive a payment request and respond with an approval for transmission to a vender, such as vendor server 150, to receive a payment authorization to dispense one or more of products 124. However, in other embodiments, payment provider server 140 may include data and/or processes corresponding to vending machine 120, for example, a displayable list or menu of products 124.

In various embodiments, payment provider server 140 includes other applications 144 as may be desired in particular embodiments to provide desired features to payment provider server 140. For example, other applications 144 may include security applications for implementing client-side security features, programmatic client applications for interfacing with appropriate application programming interfaces (APIs) over network 160, or other types of applications. Other applications 144 may contain software programs, such as a graphical user interface (GUI), executable by a processor that is configured to provide an interface to a user.

Payment provider server 140 database 146. Payment provider server 140 may maintain a plurality of user accounts in database 146, each of which may include account information associated with individual users, such as user 102. For example, database 146 may include private financial information of users of devices such as account numbers, passwords, device identifiers, user names, phone numbers, credit card information, bank information, or other financial information which may be used to facilitate online transactions by user 102. Database 146 may also include information associated with the transaction history processing described herein. Advantageously, database 146 may be configured to interact with transaction processing application 142 on behalf of user 102 during a transaction with purchase application 112 to handle payments using account information corresponding to user 102.

Database 146 may further include data corresponding to vending machine 120 and/or products 124. For example, database 146 may include menus and/or lists of products for sale at vending machine 120, including inventory levels if desired. Additionally, database 146 may include further information, such as nutritional data corresponding to products 124. In some embodiments, database 146 may include cross-promotional products and/or preferences for use in upselling products, for example, displaying a message to user 102 after purchasing a drink such as, "Would you like chips with your drink."

In various embodiments, payment provider server 140 includes at least one network interface component (NIC) 148 adapted to communicate with network 160 including user device 110 and/or vendor server 150. In various embodiments, network interface component 148 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Vendor server 150 may be maintained, for example, by a consumer product provider, which may provide a NICM, such as vending machine 120, for use by user 102. In this regard, vendor server 150 includes one or more processing application which may be configured to interact with user device 110 and/or payment provider server 140 over network 160 to facilitate payments and dispensing of products between user device 110 and vending machine 120. In one example, vendor server 150 may be provided by a consumer product provider, such as COCACOLA®, or an online marketplace provider, such as Ebay®, Inc. of San Jose, Calif., USA.

Vendor server 150 of FIG. 1 includes an authorization application 152, inventory data 154, and a network interface component 156. Authorization application 152 may correspond to processes, procedures, and/or applications executable by a hardware processor, for example, a software program. In other embodiments, vendor server 150 may include additional or different software as required.

Vendor server 150 may include one or more authorization application 152, which may be configured interact with purchase application 112 of user device 110 and/or transaction processing application 142 over network 160 to facilitate dispensing of products 124 of vending machine 120. In various embodiments, authorization application 152 includes feature to receive approvals of purchase requests, for example an approval designating a purchase request including a product, product price, machine identifier, and funding source information, and effectuate dispensing of the designated item. In such embodiments, vendor server 150 may include data and/or processes corresponding to vending machine 120, for example, an encrypted message corresponding to dispensing of a purchased item from products 124 or other desired information. Authorization application may receive the approval of the purchase request directly from payment provider server 140 or may receive the approval from user device 110 after payment provider server 140 has approved the purchase request.

Inventory data 154 may correspond generally to data of purchased and purchasable products at vending machine 120. Inventory data 154 may be received from vending machine 120, for example using an Internet connection of user device 110 after a short range communication link is established between user device 110 and vending machine 120. Inventory data 154 may include current stocks of products 124, sold out products of products 124, purchase demands and/or rates of products 124, or other desired data. Inventory data 126 may be utilized with payment provider server 140 to adjust viewable inventory levels of products 124 for display to user 102. Inventory data 154 may also be utilized to with an owner of vendor server 150, such as a vendor, to provide helpful analytics, track inventory levels of products 124, or other desired function.

In various embodiments, vendor server 150 includes at least one network interface component (NIC) 156 adapted to communicate with network 160 including user device 110 and/or payment provider server 140. In various embodiments, network interface component 156 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system environment 100.

Figure 2:
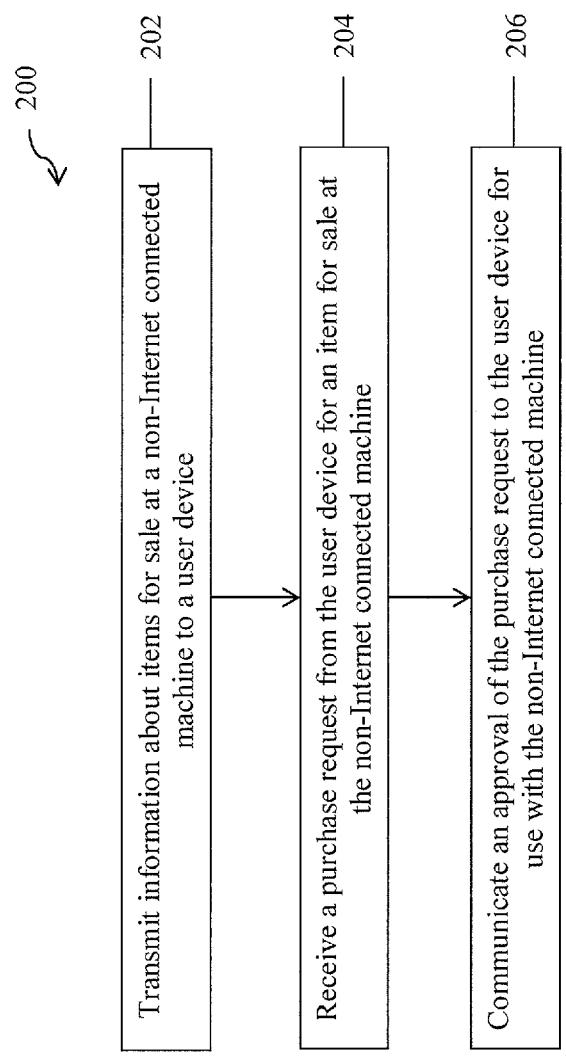
FIG. 2 is a flowchart illustrating a method for use by a payment service server for an electronic payment to a non-Internet connected device according to one embodiment.

Referring now to FIG. 2, FIG. 2 is a flowchart illustrating a method for use by a payment service server for an electronic payment to a non-Internet connected device according to one embodiment. At step 202, a server, such as payment provider server 140, transmits information about items for sale at a non-Internet connected machine to a user device. The information may be transmitted in response to a request by user device 110 to view information related to a plurality of NICM of a specific NICM. For example, user 102 may access electronic payment module 130 of vending machine 120 using user device 110 and receive a machine identifier from identifiers 136. The machine identifier may be transmitted to payment provider server 140 to receive information corresponding to vending machine 120. In other embodiments, payment provider server 140 may receive a location of user device 110 and transmit information corresponding to a plurality of NICM near user device 110.

In various embodiments, payment provider server 140 may include information in database 146 for transmission to user device 110 to display to user 102. The information may correspond to lists of products 124, such as a menu. The information may further include available inventory, nutritional information, or other desirable data.

Additional data may be transmitted to user device 110 during transmission of information corresponding to items for sale at the non-Internet connected machine In various embodiments, a user may not know a location of a NICM configured to accept electronic payments. However, the user may utilize a user device to access payment provider server 140 and receive locations of available NICMs with lists of available products at each machine. The user can further receive directions, map coordinates, and/or a GPS location of desired NICM.

At step 204, the server receives a purchase request from the user device for an item for sale at the non-Internet connected machine. Payment provider server 140 may receive a purchase request from user device 110 after user 102 selects a product for purchase of products 124. The purchase request may designate a product and further include funding information such as a funding source or a user account including a funding source. Payment provider server 140 may execute transaction processing application 142 approve the purchase request after review. Transaction processing application 142 may verify the funding source and/or user account. Transaction processing application 142 may determine if there are any limitations and/or restrictions on a user account included in database 146 and if the restrictions are met.

If transaction processing application 142 approves the purchase request, an approval is communicated to the user device for use with the non-Internet connected machine at step 206. The approval may include identifying information such as a product name, product price, product code, a machine identifier, and/or a transaction number. Additionally, the approval may include a payment authorization, receipt, or other payment verification. In certain embodiments, payment provider server 140 may communicate the payment authorization included in the approval to user device 110 for transmission to vending machine 120. However, in other embodiments, vendor server 150 may first receive the approval and authorize the payment verification included in the approval by transmitting a payment authorization to user device 110. The payment authorization may include an encrypted message, the machine identifier, and/or product code for dispensing the purchased item. After vending machine 120 receives a payment authorization, vending machine 120 may dispense the purchased item of products 124. In embodiments where the payment authorization includes an encrypted message, vending machine 120 may include an encryption key, such as a public key of an asymmetric key pair, to decrypt the encrypted message.

In certain embodiments, user device 110 may remotely purchase an item from products 124 without a short range communication link established concurrently with vending machine 120. Thus, user device 110 may store the approval and redeem the approval when user device 110 is in communication range of vending machine 110.

Figure 3:
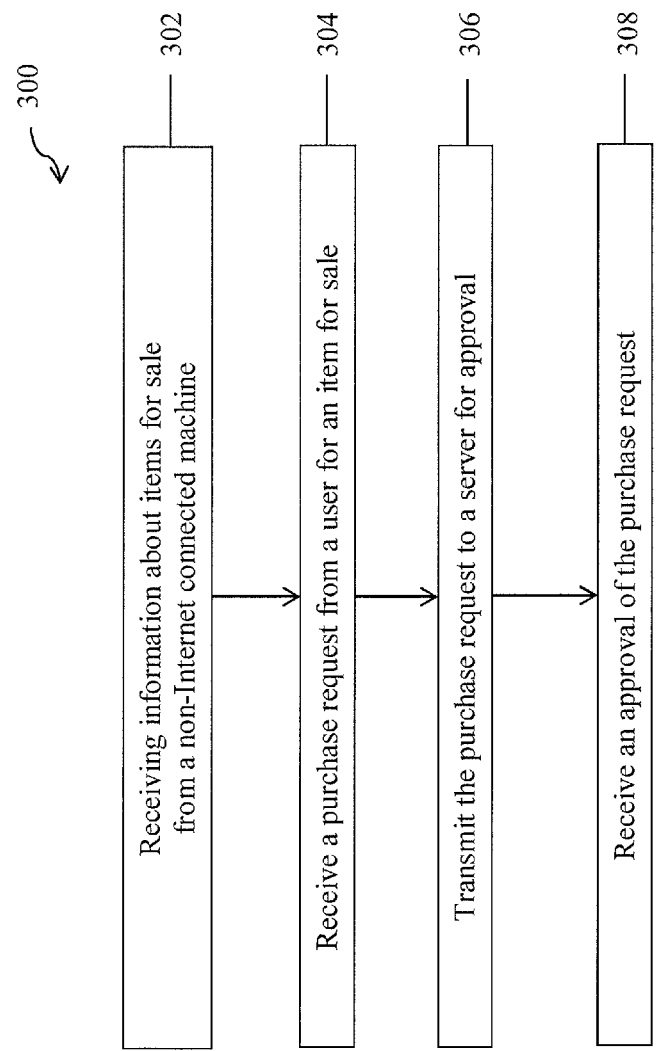
FIG. 3 is a flowchart illustrating a method for use by a user device for an electronic payment to a non-Internet connected device according to one embodiment.

FIG. 3 is a flowchart illustrating a method for use by a user device for an electronic payment to a non-Internet connected device according to one embodiment. FIG. 3 presents a method according to another embodiment for an electronic payment. At step 302, a user device, such as user device 110, receives information about items for sale from a non-Internet connected machine. In embodiments of FIG. 3, communication module 118 of user device 110 connects to communication module 134 of electronic payment module 130. As previously discussed, user device 110 and electronic payment module may utilize a short range wireless communication connection, such as near field communication, radio communication, infrared communication, and Bluetooth communication. User device 110 may transmit a device identifier and receive a listing of items for sale, as well as information corresponding to vending machine 120, such as a machine identifier.

Once the user device has received information about items for sale at the non-Internet connected machine, the user device receives a purchase request for an item for sale at step 304. The purchase request may designate a product name, product price, product code, a machine identifier, and/or a transaction number. The purchase request may be received after a user utilizes user device 110 and/or vending machine 120 to select at least one product of products 124 for purchase. For example, user 102 may utilize user device 110 to view and select a product while user device 110 is in communication with electronic payment module 130. In another embodiment, user 102 may also utilize product dispensing module 122 to select a product to purchase and electronic payment module may transmit the product information, such as a product name, product price, product code, a machine identifier, and/or a transaction number to user device 110. Once user device 110 has identified a product, a machine identifier, and/or a transaction number, user device 110 may request funding source information. The funding source information may include a funding card and/or a user account. Thus, the payment request may include a product name, product price, product code, a machine identifier, a transaction number, a funding source, and/or a user account.

At step 306, the user device transmits the purchase request to a server for approval. The purchase request may be transmitted to payment provider server 140 for approval as discussed herein. Transaction processing application 142 of payment provider server 140 may processes a funding source according to payment details included in the payment request, such as a product price and/or transaction number. Transaction processing application 142 may utilize a user account provided with the purchase request to acquire a funding source, or the funding source may be provided in the purchase request. As previously discussed, transaction processing application 142 may determine if there are any restrictions and/or limitations corresponding to the user account and may take appropriate actions as desired.

Once transaction processing application 142 has processed the purchase request, an approval is received by the user device of the purchase request at step 308. User device 110 may receive the approval and use a payment authorization included in the approval with electronic payment module 130 to dispense a purchased item of products 124 from vending machine 120.

In various embodiments, user device 110 may transmit the approval to vendor server 150 for authorization. User device may transmit an approval containing, for example, a machine identifier, product code or other identifying information, and transaction approval information. Vendor server 150 may utilize authorization application 152 to authorize the approval and transmit an authorization message to user device 110. The authorization message may include a dispense message including a machine identification and/or a product identification code. The authorization message may be encrypted, for example, by a private key of vendor server 150. Electronic payment module may then decrypt the authorization message received from user device 110 using a public key and dispense the product.

Figure 4:
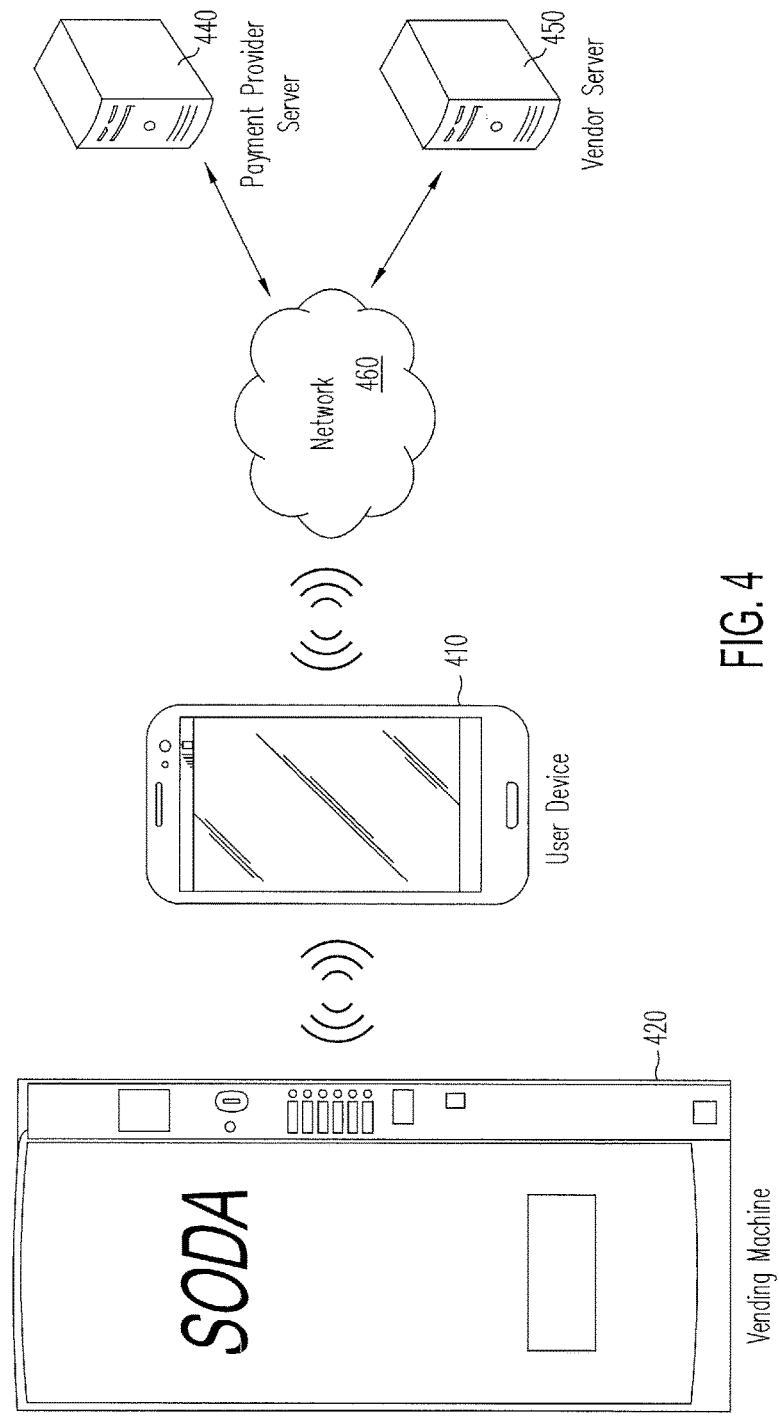
FIG. 4 is an exemplary system environment flowchart for an electronic payment to a non-Internet connected device according to one embodiment.

FIG. 4 is an exemplary system environment flowchart for an electronic payment to a non-Internet connected device according to one embodiment. FIG. 4 shows a user device 410 implementing an electronic payment to a vending machine 420. User device 410 may utilize a network 460 to communicate with a payment provider server 440 and a vendor server 450 in order to effectuate the electronic payment.

Initially, the user or consumer of user device 410 may download a mobile app from payment provider server 440, such as PayPal, Inc. of San Jose, Calif., to enable the user to make payments to a NICM. Once downloaded, the user may be asked to sign in through a payment provider credential, such as with a user identifier (e.g., email, name, phone number) and a password or PIN. The user can configure desired settings for the app, such as turning on a "remember me" feature. If such a feature is enabled, the user may set transaction limits for protection. For example, the user may set a maximum transaction amount per transaction, per day, or other type of time limit or restriction. If a requested transaction is above a set limit, the user may be asked to enter a password/PIN to continue. If under the limit, the transaction may be allowed to proceed without any further user-supplied authentication. The user may also set an option to automatically connect or pair with "accepted" machines, e.g., machines that are registered or approved by the payment provider.

A user of user device 410 may approach vending machine 420 and receive a menu of items for purchase at vending machine 420. User device 410 may receive the menu from vending machine 420, for example, by initiating a short range communication with vending machine 420, such as near field communication, radio communication, infrared communication, and Bluetooth communication, and transmitting a device identifier to vending machine 420. Thus, vending machine 420 may transmit a purchase request including product name, product price, product code, a machine identifier, and/or a transaction number to user device 410. However, in other embodiments, user device 410 may access a menu form payment provider server 440 and/or vendor server 450 over network 460. In such embodiments, the user may receive the menu after receiving a machine identifier from vending machine 420, or may access a list and a specific nearby non-Internet connected machine from payment provider server 440 and/or vendor server 450, or example, when requesting a remote electronic payment.

Once the user has selected an item and initiated a purchase request, user device 410 may communicate the purchase request to payment service provider 440. In various embodiments, user device 410 may transmit as a product name, product price, product code, a machine identifier, and/or a transaction number with funding source information, such as a user account and/or funding card or account information to payment provider server 440.

In response, payment provider server 440 may validate the funding source, such as by checking for adequate funds and charging the account/funding card. Payment provider server 440 may further check for any limitation and/or restrictions associated with the user account, and determine if those limitations and/or restrictions are met. User device 410 may receive an approval include as a product name, product price, product code, a machine identifier, a transaction number with payment authorization. However, in other embodiments, user device 410 may receive only a payment approval having a receipt redeemable with payment provider server 440 for the amount requested by user device 410.

Once user device 410 has received an approval with a payment authorization, user device 410 may, in some embodiments, transmit the payment authorization to vending machine 420 to dispense and receive the product. In other embodiments, user device 410 may be required to first transmit the approval to vendor server 450. Vendor server 450 may then authorize the approval and return a payment authorization message to user device 410 including a dispense process for vending machine 420. The message may be encrypted, such as using a private key of an asymmetric key pair possessed by vendor server 450.

User device 410 may then transmit the payment authorization to vending machine 420 in such embodiments. Vending machine 420 may decrypt the message using a corresponding public key and dispense the products to the user. Thus, the user is enabled to make an electronic payment to a NICM.

Figure 5:
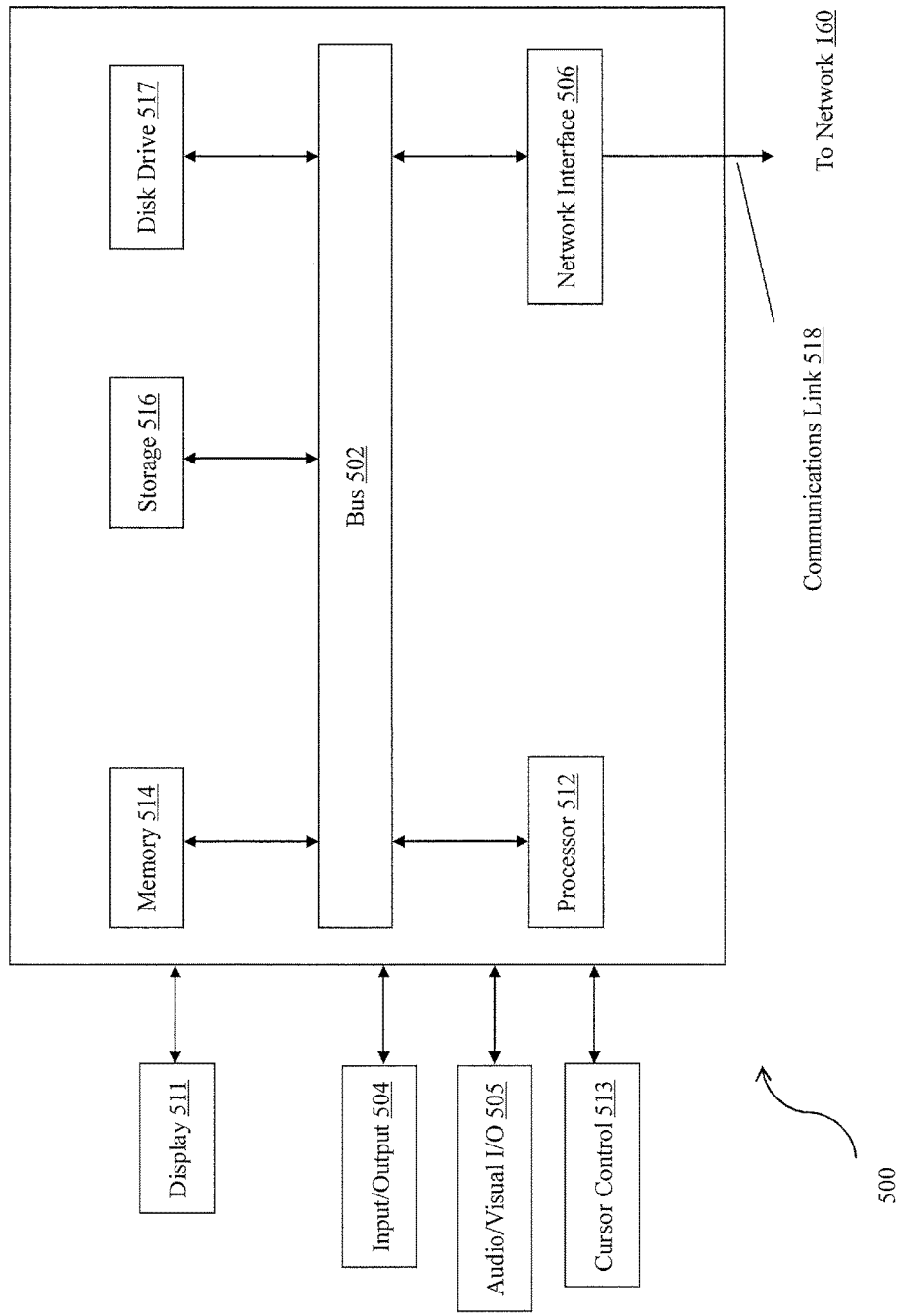
FIG. 5 is a block diagram of a computer system suitable for implementing one or more components in FIGS. 1 and 4 according to one embodiment of the present disclosure.

FIG. 5 is a block diagram of a computer system 500 suitable for implementing one or more embodiments of the present disclosure. In various implementations, the user device may comprise a personal computing device (e.g., a personal computer, laptop, smart phone, tablet, PDA, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons or links, etc., and sends a corresponding signal to bus 502. I/O component 404 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another user device, a merchant server, or a payment provider server via network 560. In one embodiment, the transmission is wireless, although other transmission mediums and methods may also be suitable. A processor 512, which can be a microcontroller, digital signal processor (DSP), or other processing component, processes these various signals, such as for display on computer system 500 or transmission to other devices via a communication link 418. Processor 512 may also control transmission of information, such as cookies or IP addresses, to other devices.

Components of computer system 500 also include a system memory component 514 (e.g., RAM), a static storage component 516 (e.g., ROM), and/or a disk drive 517 to store information, such as account information, transaction numbers, machine IDs, and other information described above. Computer system 500 performs specific operations by processor 512 and other components by executing one or more sequences of instructions contained in system memory component 514. Instructions may be performed by one or more processors 512. Logic may be encoded in a computer readable medium, which may refer to any medium that participates in providing instructions to processor 512 for execution. Such a medium may take many forms, including but not limited to, non-volatile media, volatile media, and transmission media. In various implementations, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more machine readable mediums, including non-transitory machine readable medium. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Embodiments described herein are exemplary only. One skilled in the art may recognize various alternative embodiments from those specifically disclosed. Those alternative embodiments are also intended to be within the scope of this disclosure. As such, the embodiments are limited only by the following claims.

What is claimed is:

1. A system comprising:
a non-transitory memory; and
one or more hardware processors coupled to the non-transitory memory and configured to read instructions from the non-transitory memory to cause the system to perform operations comprising:
receiving, by a payment provider, a request to view information associated with at least one of a plurality of non-Internet connected machines associated with a location of a user device for a user, wherein the request comprises the location of the user device;
determining, based at least in part on the location, identification of the plurality of non-Internet connected machines within a distance to the user device;
communicating the identification of the plurality of non-Internet connected machines to the user device;
receiving, from the user device, a selection of a first non-Internet connected machine from the plurality of non-Internet connected machines, wherein the selection comprises identification information of the first non-Internet connected machine;
in response to approving a request to purchase at least one item from the first non-Internet connected machine, generating an executable code for dispensing the at least one item from the first non-Internet connected machine, wherein the executable code is encrypted using a key associated with the first non-Internet connected machine;
transmitting the executable code to the user device;
in response to determining that the user device is connected to the first non-Internet through a local wireless connection, causing the first non-Internet connected machine to activate and dispense the at least one item the executable code, wherein the executable code is communicated to the first non-Internet connected machine via the local wireless connection between the user device and the first non-Internet connected machine;
determining a change in inventory data for the first non-Internet connected machine based on the causing the at least one item to be dispensed via the local wireless connection; and
adjusting, in a graphical user interface displayed by a vendor device associated with the first non-Internet connected machine, the inventory data based on the change.

2. The system of claim 1, wherein the local wireless connection includes one of near field communication, radio communication, infrared communication, or Bluetooth communication.

3. The system of claim 1, wherein the operations further comprise:
transmitting the change in the inventory data corresponding to the first non-Internet connected machine to a server of an operator of the first non-Internet connected machine.

4. The system of claim 1, wherein the executable code includes at least one of a unique identifier for the non-Internet connected machine or a transaction number corresponding to the request.

5. The system of claim 1, wherein the operations further comprise:

determining whether there is a limitation or a restriction associated with an account corresponding to the user device; and if there is a limitation or a restriction, determining whether the limitation or the restriction is satisfied for the request.

6. The system of claim 5, wherein the operations further comprise:

requesting an authenticating credential from the user of the user device if the limitation or the restriction is not satisfied.

7. A non-transitory machine-readable medium having stored thereon machine-readable instructions executable to cause a machine to perform operations comprising:

receiving, by a payment provider, a request to view information associated with at least one of a plurality of non-Internet connected machines associated with a location of a user device for a user, wherein the request comprises the location of the user device;

determining, based at least in part on the location, identification of the plurality of non-Internet connected machines within a distance to the user device;

communicating the identification of the plurality of non-Internet connected machines to the user device;

receiving, from the user device, a selection of a first non-Internet connected machine from the plurality of non-Internet connected machines, wherein the selection comprises identification information of the first non-Internet connected machine;

in response to approving a request to purchase at least one item from the first non-Internet connected machine, generating an executable code for dispensing the at least one item from the first non-Internet connected machine, wherein the executable code is encrypted using a key associated with the first non-Internet connected machine;

transmitting the executable code to the user device;

in response to determining that the user device is connected to the first non-Internet through a local wireless connection, causing the first non-Internet connected machine to activate and dispense the at least one item using the executable code, wherein the executable code is communicated to the first non-Internet connected machine via the local wireless connection between the user device and the first non-Internet connected machine;

determining a change in inventory data for the first non-Internet connected machine based on the causing the at least one item to be dispensed via the local wireless connection; and adjusting, in a graphical user interface displayed by a vendor device associated with the first non-Internet connected machine, the inventory data based on the change.

8. The non-transitory machine-readable medium of claim 7, wherein the operations further comprise:

transmitting the change in the inventory data corresponding to the first non-Internet connected machine to a server device of an operator of the first non-Internet connected machine.

9. The non-transitory machine-readable medium of claim 7, wherein the executable code comprises a unique identifier for the first non-Internet connected machine and a transaction number corresponding to the request.

10. The non-transitory machine-readable medium of claim 7, wherein the operations further comprise:

determining whether there is a limitation or a restriction associated with an account corresponding to the user device; and if there is a limitation or a restriction, determining whether the limitation or the restriction is satisfied for the request.

11. The non-transitory machine-readable medium of claim 10, wherein the operations further comprise:

requesting an authenticating credential from the user of the user device if the limitation or the restriction is not satisfied.

12. A method comprising:

receiving, by a payment provider, a request to view information associated with at least one of a plurality of non-Internet connected machines associated with a location of a user device for a user, wherein the request comprises the location of the user device;

determining, based at least in part on the location, identification of the plurality of non-Internet connected machines within a distance to the user device;

communicating the identification of the plurality of non-Internet connected machines to the user device;

receiving, from the user device, a selection of a first non-Internet connected machine from the plurality of non-Internet connected machines, wherein the selection comprises identification information of the first non-Internet connected machine;

in response to approving a request to purchase at least one item from the first non-Internet connected machine, generating an executable code for dispensing the at least one item from the first non-Internet connected machine, wherein the executable code is encrypted using a key associated with the first non-Internet connected machine;

transmitting the executable code to the user device;

in response to determining that the user device is connected to the first non-Internet through a local wireless connection, causing the first non-Internet connected machine to activate and dispense the at least one item using the executable code, wherein the executable code is communicated to the first non-Internet connected machine via the local wireless connection between the user device and the first non-Internet connected machine;

determining a change in inventory data for the first non-Internet connected machine based on the causing the at least one item to be dispensed via the local wireless connection; and adjusting, in a graphical user interface displayed by a vendor device associated with the first non-Internet connected machine, the inventory data based on the change.

13. The method of claim 12, further comprising:

transmitting the change in the inventory data corresponding to the first non-Internet connected machine to a server device of an operator of the first non-Internet connected machine.

14. The method of claim 12, wherein the executable code comprises a unique identifier for the first non-Internet connected machine and a transaction number corresponding to the request.

15. The method of claim 12 further comprising:

determining whether there is a limitation or a restriction associated with an account corresponding to the user device; and if there is a limitation or a restriction, determining whether the limitation or the restriction is satisfied for the request.

16. The system of claim 1, wherein the operations further comprise:
in response to the selection, accessing the inventory data comprising a stock of items at the first non-Internet connected machine and sold out items at the first non-Internet connected machine; and
communicating the inventory data to the user device.

17. The non-transitory machine-readable medium of claim 7, wherein the operations further comprise:
in response to the selection, accessing the inventory data comprising a stock of items at the first non-Internet connected machine and sold out items at the first non-Internet connected machine; and
communicating the inventory data to the user device.

18. The method of claim 12, wherein the method further comprises:
in response to the selection, accessing the inventory data comprising a stock of items at the first non-Internet connected machine and sold out items at the first non-Internet connected machine; and
communicating the inventory data to the user device.

* * * * *